United States Patent Office 3,525,686
Patented Aug. 25, 1970

3,525,686
HEMODIALYSIS SOLUTION CONTAINING SORBITOL AND METHOD OF USING SAME
Martin Roberts, Seattle, Wash., assignor to American Hospital Supply Corporation, Evanston, Ill., a corporation of Illinois
No Drawing. Filed Mar. 19, 1968, Ser. No. 714,338
Int. Cl. B01d 13/00
U.S. Cl. 210—22          9 Claims

ABSTRACT OF THE DISCLOSURE

A hemodialysis solution for dialyzing waste chemical products from blood and correcting fluid and electrolyte abnormalities. This solution containing 0.1% to 7.5% sorbitol by weight and electrolytes, does not carmelize and is stable in the pH range of 6.5 to 7.7.

---

This invention relates to medical solutions used to extract waste chemical products such as creatinine, urea, etc. from a patient's blood and to correct fluid and electrolyte abnormalities when his kidneys are not functioning properly.

The invention is particularly suited for a hemodialysis process called "peritoneal dialysis." In peritoneal dialysis, a dialyzing solution is injected into a patient's peritoneal cavity, usually through a catheter inserted through his abdominal wall. This solution remains in the peritoneal cavity while undesirable substances in the patient's blood diffuse across his peritoneal membrane into the dialyzing solution. After a period of time the dialyzing solution is removed from the peritoneal cavity, carrying with it the diffused substances. This process is usually repeated 12 to 24 times during the course of a single dialysis procedure and may be done when diffusible substances in the blood approach toxic levels because of the patient's inability to eliminate them normally through the kidney.

The dialysis solutions contain dextrose (also called glucose) and electrolytes to control the extraction of these substances from the blood by the dialyzing solutions. Although dextrose-containing dialyzing solution has been used successfully in many patients, it does have shortcomings. First, if the patient is a chronic uremic or a diabetic and has a low tolerance for dextrose, dialysis with such a solution could cause hyperglycemia.

Peritoneal dialysis solution containing dextrose has also been found to cause abdominal pain in certain patients. It is believed that pain may be caused in part by the acid pH of dextrose-containing dialysis solutions. Such solutions are used at a pH of approximately 5.5. Attempts to make usable sterile dextrose solutions at a higher pH have not been successful. At a higher pH such as 7.4 (physiologic pH), dextrose carmelizes upon steam-sterilization at 240° F. or storage, decomposing to form 5-hydroxymethyl furfural, and other products. To avoid carmelization, the present practice is to make up dextrose-containing peritoneal dialysis solutions at a pH of 5.7 to 5.9.

It is an object of this invention to provide a peritoneal dialysis solution with a more physiologic pH, which solution can be steam sterilized without an appreciable drop in pH.

It is also an object of this invention to provide a peritoneal dialysis solution which does not cause significant hyperglycemia, particularly in patients who have low dextrose tolerance.

I have found that a peritoneal dialysis solution containing sorbitol can be prepared with a stable pH in the range of 6.5 to 7.7 to more closely approximate the pH of blood which is in the range of 7.35 to 7.45 pH. Thus, abdominal pain is reduced because the solution has a less acid pH than dextrose solution. This sorbitol solution shows no appreciable pH drop after steam sterilization at about 240° F. Although, like dextrose, sorbitol is metabolized in the body to $CO_2$ and water, it has been clinically demonstrated that sorbitol does not cause significant hyperglycemia.

The peritoneal dialysis solution of this invention contains 1% to 7.5% sorbitol by weight and electrolytes. Four examples of solutions with sorbitol in this range are given in the table below:

PERITONEAL DIALYSIS SOLUTION (CONCENTRATIONS)

|  | 1 | 2 | 3 | 4 |
| --- | --- | --- | --- | --- |
| Sorbitol (percent w./v.) | 1.5 | 4.25 | 5 | 7 |
| Chloride (meq./l.) | 101 | 99 | 85 | 105 |
| Sodium (meq./l.) | 140 | 130 | 112 | 142.5 |
| Calcium (meq./l.) | 4 | 2.5 | 2 | 1.5 |
| Magnesium (meq./l.) | 1.5 | 1.5 | 1.0 | 2.5 |
| Acetate (meq./l.) | 45 | 35 | 30 | 41 |
| pH | 6.8 | 7.0 | 7.6 | 7.4 |

In addition to the specific examples of sorbitol concentrations, other concentrations of sorbitol in the range of 1% to 7.5% could also be used. The electrolytes could be varied within the operative range of 110 to 145 meq./l. sodium, 80–110 meq./l. chloride, 1.0 to 4.0 meq./l. calcium, 1 to 3 meq/l. magnesium, and 25 to 45 meq./l. acetate or other bicarbonate precursor, such as lactate.

The hemodialysis solutions listed in the above table are especially suited for peritoneal dialysis. It is also desirable to use sorbitol containing hemodialysis solutions in artificial kidney machines. Throughout the specification and claims, the word "hemodialysis" has been used to include in this generic term both peritoneal dialysis and artificial kidney machine dialysis. Although I have defined the word this way, it is understood that some workers in the art use the word "hemodialysis" in a contrary manner to distinguish dialysis with artificial kidney machines from peritoneal dialysis.

In artificial kidney machine dialysis, the patient's blood is circulated outside of his body through the artificial kidney machine. Within the machine the blood is placed on one side of a semipermeable membrane and dialyzing solution is placed on an opposite side of the membrane. After at least some of the toxic substances in the blood have migrated across the membrane, the solution is removed from the machine, carrying with it these toxic substances.

In some types of artificial kidney machines used to dialyze a patient, a pressure differential is induced across the dialyzing membrane with the higher pressure on the blood side. The rate of ultrafiltration removal of water from blood across the membrane can be controlled by varying the pressure differential. Also, the pressure differential is a safety factor, because if the membrane gets a hole in it, blood will flow to the solution side and not vice versa. Since the membrane prevents direct mixing of the solution with the blood or the passage of bacteria and because very large volumes of solution are used, solutions for artificial kidney machines are usually not sterilized. However, in some instances it might be advantageous to market the solution sterile and this can be easily done with sorbitol containing hemodialysis solution.

Because ultrafiltration is accomplished by pressure differential, artificial kidney solutions for use in some kidney machines are more dilute than peritoneal dialysis solutions. Sorbitol is used in these artificial kidney machine solutions in the range of 0.1% to 1.0% by weight. Operative ranges for the electrolytes are: calcium 1 to 4.0 meq./l., chloride 75 to 105 meq./l., sodium 110 to 145 meq./l., magnesium 0.5 to 3 meq./l., acetate or lactate 25 to 45 meq./l, and potassium 0 to 4 meq./l. Specific examples of sorbitol solutions for artificial kidney machine dialysis are as follows:

HEMODIALYSIS SOLUTIONS FOR ARTIFICIAL KIDNEY MACHINES (CONCENTRATIONS)

|  | #1 | #2 | #3 |
|---|---|---|---|
| Sorbitol (percent w./v.) | 0.2 | 0 | 0.8 |
| Chloride (meq./l.) | 99 | 79.5 | 103 |
| Sodium (meq./l.) | 130 | 110 | 130 |
| Calcium (meq./.) | 2.5 | 2.5 | 3.0 |
| Magnesium (meq./l.) | 1.5 | 0.5 | 1.5 |
| Acetate (meq./l.) | 35 | 35 | 35 |
| Potassium (meq./l.) | 0 | 1.5 | 3.5 |
| pH | 7.4 | 7.0 | 7.6 |

For use in artificial kidney machines, sorbitol solutions have distinct advantages over dextrose hemodialysis solutions. As mentioned above, artificial kidney machines use a very large amount of dilute hemodialysis solutions. Manufacturers usually supply solutions for an artificial kidney machine in concentrated forms to customers. The customers then dilute the solutions (usually 35 to 1) to get the desired concentration for use in the machine. In combination with the electrolytes dextrose is soluble only up to 17% by weight, while sorbitol is soluble up to 28% by weight. Thus, the sorbitol solutions with electrolytes can be prepared to yield dilute solutions with much higher oxmotic effect.

Sorbitol solutions have an additional practical advantage with regard to artificial kidney machines. Formaldehyde solution is frequently used to disinfect the artificial kidney machines. After disinfection, dextrose test tapes are used to check rinsings from both the blood and solution compartments for residual formaldehyde. It would be most desirable to rinse the solution compartment with hemodialysis solution and the blood compartment with normal saline so that as soon as traces of formaldehyde are eliminated, the machine would be ready for use. Unfortunately, this cannot be done with available dialysis solutions because dextrose interferes with simple tests for formaldehyde, giving a false positive test. Sorbitol does not react with the formaldehyde test reagents. Hence simple test tapes can be used to check the artificial kidney for residual formaldehyde.

Throughout the specification I have used specific examples to illustrate my invention. It is understood that persons skilled in the art can make certain modifications to these specific examples without departing from the spirit and scope of the invention.

I claim:

1. A hemodialysis solution for removing waste chemical products from blood, said solution containing 0.1% to 7.5% sorbitol by weight and 1.0 to 4.0 meq./l of calcium ions, said solution having a stable pH in the range of 6.5 to 7.7.

2. A hemodialysis solution as set forth in claim 1 wherein the solution contains 1.0% to 7.5% sorbitol by weight and is adapted for use in peritoneal dialysis.

3. A hemodialysis solution as set forth in claim 2 wherein the solution contains 1.5% sorbitol by weight.

4. A hemodialysis solution as set forth in claim 2 wherein the solution contains 4.25% sorbitol by weight.

5. A hemodialysis solution as set forth in claim 1 wherein the solution contains 110 to 145 meq./l of sodium.

6. A hemodialysis solution as set forth in claim 1 wherein the solution contains 0.1% to 1.0% sorbitol by weight and is adapted for use in an artificial kidney machine having an induced pressure differential across a dialysis membrane of the artificial kidney machine.

7. A method of removing toxic substances from blood by dialysis including: placing a hemodialysis solution containing 0.1% to 7.5% sorbitol by weight on one side of a semipermeable membrane which has blood on an opposite side of the membrane; keeping the hemodialysis solution in contact with the membrane until at least a portion of the blood's waste chemical products migrate across the membrane into the hemodialysis solution; and finally removing the hemodialysis solution carrying the waste chemical products from contact with the membrane.

8. The method as set forth in claim 7 wherein the solution contains 1.0% to 7.5% sorbitol by weight and is adapted for use in peritoneal dialysis.

9. The method as set forth in claim 7 wherein the solution contains 0.1% to 1.0% sorbitol and is adapted for use in an artificial kidney machine having an induced pressure differential across a dialyzing membrane of the artificial kidney machine.

References Cited

UNITED STATES PATENTS 3,352,779  11/1967  Austin et al. _____ 210—321 X

OTHER REFERENCES

Yutuc et al.: "Substitution of Sorbitol for Dextrose in Peritoneal Irrigation Fluid: A Preliminary Report," from Transactions American Society for Artificial Internal Organs, pub. June 16, 1967, pp. 168–171 relied on.

REUBEN FRIEDMAN, Primary Examiner

F. A. SPEAR, JR., Assistant Examiner

U.S. Cl. X.R.

210—321